United States Patent
Petria et al.

(10) Patent No.: US 10,575,357 B2
(45) Date of Patent: Feb. 25, 2020

(54) APPARATUS AND METHOD FOR TRAFFIC PREDICTION AND BANDWIDTH AGGREGATION

(71) Applicant: Intel Corporation, Santa Clara, CA (US)

(72) Inventors: Silviu Petria, Stilpeni (RO); Andra Paraschiv, Braila (RO)

(73) Assignee: Intel Corporation, Santa Clara, CA (US)

( * ) Notice: Subject to any disclaimer, the term of this patent is extended or adjusted under 35 U.S.C. 154(b) by 65 days.

(21) Appl. No.: 15/736,281

(22) PCT Filed: Jun. 19, 2015

(86) PCT No.: PCT/RO2015/000017
§ 371 (c)(1),
(2) Date: Apr. 5, 2018

(87) PCT Pub. No.: WO2016/204639
PCT Pub. Date: Dec. 22, 2016

(65) Prior Publication Data
US 2019/0166643 A1 May 30, 2019

(51) Int. Cl.
| | |
|---|---|
| H04W 76/16 | (2018.01) |
| H04W 28/08 | (2009.01) |
| H04L 12/707 | (2013.01) |
| H04W 24/08 | (2009.01) |
| H04W 88/06 | (2009.01) |
| H04L 12/26 | (2006.01) |

(52) U.S. Cl.
CPC ............ *H04W 76/16* (2018.02); *H04L 45/24* (2013.01); *H04W 24/08* (2013.01); *H04W 28/08* (2013.01); *H04L 43/0888* (2013.01); *H04W 88/06* (2013.01)

(58) Field of Classification Search
CPC ...... H04Q 11/0478; H04L 47/10; H04L 49/90
See application file for complete search history.

(56) References Cited

U.S. PATENT DOCUMENTS 6,185,222 B1 * 2/2001 Hughes ................. H04L 49/106
370/414

FOREIGN PATENT DOCUMENTS

WO    WO2013/055649 A1    4/2013

OTHER PUBLICATIONS

Office Action dated Jan. 16, 2019 for European Patent Application No. 15750145.3, 7 pages.
(Continued)

*Primary Examiner* — Chandrahas B Patel
(74) *Attorney, Agent, or Firm* — Schwabe, Williamson & Wyatt, P.C.

(57) ABSTRACT

Embodiments of apparatuses and methods for traffic prediction and bandwidth aggregation are described. In various embodiments, an apparatus may include a first network interface and a second network interface with support of a multipath transport protocol. The apparatus may further include a control module to determine whether to aggregate bandwidth of the first and second network interfaces under a same transport layer connection, using the multipath transport protocol, based at least in part on a traffic prediction of the first network interface. Other embodiments may be described and/or claimed.

14 Claims, 5 Drawing Sheets

(56) References Cited

OTHER PUBLICATIONS

International Search Report and Written Opinion dated Mar. 14, 2016 for International Application No. PCT/RO2015/000017, 15 pages.
Yeon-Sup Lim et al., "Improving Energy Efficiency of MPTCP for Mobile Devices", Jun. 17, 2014, pp. 1-13, retrieved form the Internet: URL:http://arxiv.org/pdf/1406.4463v1.pdf.
Search Report for R.O.C. Patent Application No. 105112635 dated Sep. 11, 2019, 2 pages.
Yeon-Sup Lim et al., "Improving Energy Efficiency of MPTCP for Mobile Devices", Jun. 17, 2014, 13 pages. arXiv:1406A463v1.

* cited by examiner

APPARATUS AND METHOD FOR TRAFFIC PREDICTION AND BANDWIDTH AGGREGATION

CROSS REFERENCE TO RELATED APPLICATIONS

The present application is a national phase entry under 35 U.S.C. § 371 of International Application No. PCT/RO2015/000017, filed Jun. 19, 2015, entitled "APPARATUS AND METHOD FOR TRAFFIC PREDICTION AND BANDWIDTH AGGREGATION", which designated, among the various States, the United States of America. The Specifications of the PCT/RO2015/000017 Application is hereby incorporated by reference.

FIELD OF THE INVENTION

The present disclosure relates generally to the technical fields of computing and networking and more particularly, to apparatuses and methods associated with network traffic prediction and bandwidth aggregation.

BACKGROUND

The background description provided herein is for the purpose of generally presenting the context of the disclosure. Unless otherwise indicated herein, the materials described in this section are not prior art to the claims in this application and are not admitted to be prior art or suggestions of the prior art, by inclusion in this section.

Network activity, e.g., downloads and uploads, may contribute significantly to the total energy consumption on mobile devices. A network interface with lesser bandwidth may take longer time to complete a data transfer session. The third generation of mobile telecommunications technology (3G) interfaces may be particularly inefficient because they consume the same amount of energy regardless of throughput. In addition, slow data transfers may also lead to the screen staying on for a longer period if the user is actively waiting for a download/upload session to complete. This may additionally increase the amount of energy consumed by mobile devices.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the figures of the accompanying drawings.

DETAILED DESCRIPTION

Embodiments of apparatuses and methods for bandwidth aggregation and traffic prediction based on contextual information and user preference are described. In various embodiments, an apparatus may include a first network interface and a second network interface with support of a multipath transport protocol. The apparatus may further include a control module to determine whether to aggregate bandwidth of the first and second network interfaces under a same transport layer connection, using the multipath transport protocol, based at least in part on a traffic prediction of the first network interface. Resultantly, the apparatus may reduce energy consumption for network activity on its devices with bandwidth aggregation, thus improving battery life. These and other aspects of the present disclosure will be more fully described below.

In the following detailed description, reference is made to the accompanying drawings, which form a part hereof, wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C). Where the disclosure recites "a" or "a first" element or the equivalent thereof, such disclosure includes one or more such elements, neither requiring nor excluding two or more such elements. Further, ordinal indicators (e.g., first, second, or third) for identified elements are used to distinguish between the elements, and do not indicate or imply a required or limited number of such elements, nor do they indicate a particular position or order of such elements unless otherwise specifically stated.

Reference in the description to one embodiment or an embodiment means that a particular feature, structure, or characteristic described in connection with the embodiment is included in at least one embodiment of the invention. The description may use the phrases "in one embodiment," "in an embodiment," "in another embodiment," "in various embodiments," or the like, which may each refer to one or more of the same or different embodiments. Furthermore, the terms "comprising," "including," "having," and the like, as used with respect to embodiments of the present disclosure, are synonymous.

In various embodiments, the term "module" may refer to, be part of, or include an application specific integrated circuit (ASIC), an electronic circuit, a processor (shared, dedicated, or group), and/or memory (shared, dedicated, or group) that execute one or more software or firmware programs, a combinational logic circuit, and/or other suitable components that provide the described functionality. In various embodiments, a module may be implemented in firmware, hardware, software, or any combination of firmware, hardware, and software.

Figure 1:
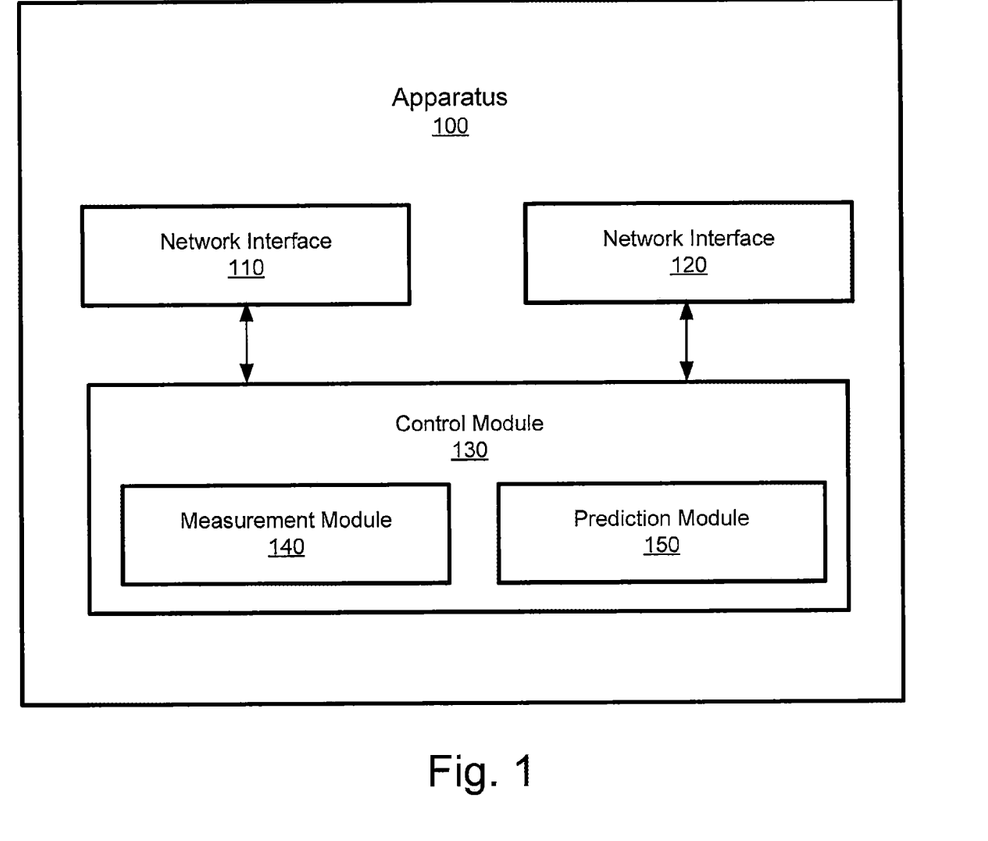
FIG. 1 is a schematic diagram illustrating an example implementation of an apparatus incorporating with the bandwidth aggregation and traffic prediction technology of the present disclosure, in accordance with various embodiments.

Referring now to FIG. 1, an example implementation of an apparatus 100 incorporated with the bandwidth aggregation and traffic prediction technology of the present disclosure, in accordance with various embodiments, is illustrated. In various embodiments, apparatus 100 may be a computing device, such as a smartphone or a wearable device. Apparatus 100 may utilize network information and/or network measurement information to make network traffic predictions. Accordingly, apparatus 100 may make bandwidth aggregation decisions based at least in part on the network traffic predictions. In various embodiments, apparatus 100 may include network interface 110, network interface 120, control module 130, measurement module 140, and prediction module 150, operatively coupled with each other, to enable apparatus 100 to predict when bandwidth aggregation may be needed and selectively aggregate the bandwidth of multiple network interfaces accordingly. Moreover, apparatus 100 may deactivate bandwidth aggregation or even further disable one or more network interfaces to preserve energy when bandwidth aggregation may not be needed, e.g., based on the network information and/or network measurement information.

Apparatus 100 may include network interface 110 and network interface 120 to communicate with other devices via one or more wireless or wired networks. These wireless or wired networks may include public and/or private networks, such as, but not limited to, LANs, WANs, or the Internet. In some embodiments, these wireless networks may include various combinations of wireless personal area networks (WPANs), wireless local area networks (WLANs), wireless metropolitan area networks (WMANs), and/or wireless wide area networks (WWANs). In some embodiments, these wireless networks may include cellular networks, for example, Code Division Multiple Access (CDMA), Wideband Code Division Multiple Access (WCDMA), Universal Mobile Telecommunication System (UMTS), Global System for Mobile Communications (GSM), Long Term Evolution (LTE), Advanced (LTE-A), among others.

In various embodiments, network interface 110 and network interface 120 may enable apparatus 100 to communicate with other devices via multiple radio access technologies. In some embodiments, network interface 110 may provide an interface for apparatus 100 to operate on licensed spectrum with cellular radio access technologies, such as CDMA, WCDMA, UMTS, GSM, LTE. On the other hand, network interface 120 may provide an interface for apparatus 100 to operate on unlicensed spectrum with variants of IEEE 802.x-based radio access technologies, such as WiFi or WiMAX, to access at least one WLAN, as an example. In some embodiments, network interface 110 or network interface 120 may also enable apparatus 100 to communicate through short range wired or wireless communications such as IrDA, Bluetooth™, near field communications (NFC), Universal Serial Bus (USB), amongst others.

When apparatus 100 is in a coverage area of multiple radio access networks, apparatus 100 may register with and communicate with one or more radio access networks. Thus, in various embodiments, network interface 110 and network interface 120 may be turned on and simultaneously communicate with their respective radio access networks. In some embodiments, the bandwidth from network interface 110 and network interface 120 may be aggregated to enable apparatus 100 to complete a data-transmission task faster than relying on one network interface alone. However, in some embodiments, apparatus 100 may deactivate or turn off one or more network interface, such as network interface 110 or network interface 120, to save energy, which may be particularly important for a mobile device running on battery.

In various embodiments, control module 130 may communicate with network interface 110 and/or network interface 120 to, e.g., receive network information. Measurement model 140 may take measurements on network performance, including network performance measurements based on the network information received from network interface 110 and/or network interface 120. Further, prediction module 150 may predict the upcoming network utilization or required throughput of respective network interface, such as network interface 110 or network interface 120, e.g., based on the prior network performance measurements from measurement model 140. Accordingly, control module 130 may determine when bandwidth aggregation may be needed and selectively aggregate the bandwidth of multiple network interfaces to accelerate a network session or save energy for apparatus 100 in a long run.

In various embodiments, control module 130 may target energy saving and be customized to achieve better user experience on apparatus 100. Network interface 110 and network interface 120 may have different energy consumption models. In some embodiments, network interface 110 may operate as a 3G interface, and network interface 120 may operate as a WiFi interface. WiFi may consume less energy than 3G, and the amount of energy used in WiFi is relatively proportional with its throughput. On the other hand, 3G is more energy hungry and it may consume the same amount of energy during a networking session regardless of its actual throughput. In some embodiments, apparatus 100 may use network interface 120 as the default active interface in a DEFAULT state, and selectively enable network interface 110 for bandwidth aggregation in a AGGREGATED state to assist network interface 120 to complete a networking session. Therefore, apparatus 100 may only use the WiFi interface transfer data at the DEFAULT state, but simultaneously utilize the 3G and WiFi interfaces to transfer data at the AGGREGATED state.

In various embodiments, control module 130 may make bandwidth aggregation decisions in real time to enable apparatus 100 to switch from the DEFAULT state to the AGGREGATED state and vice versa. In other embodiments, when apparatus 100 may have more than two network interfaces (not shown), control module 130 may determine and select a number of network interfaces to participate in bandwidth aggregation in a particular networking session. In that case, every network interface may have its own PARTICIPATING state and NON-PARTICIPATING state, and may be switched from one state to the other based on the control signal from control module 130.

In various embodiments, measurement module 140 may measure the service quality of each network interface. As an example, measurement module 140 may retrieve the bandwidth (e.g., bits/second) of a network interface, which is the maximum rate that information can be transferred via the network interface. As another example, measurement module 140 may measure the throughput of a network interface, which is the actual rate that information is transferred via the network interface. The throughput of a network interface may be controlled by its bandwidth, the signal-to-noise ratio, various hardware limitations, etc. Meanwhile, measurement module 140 may select an appropriate time window to measure the throughput. In some embodiments, the choice of the appropriate time window may relate to the specific network interface to be measured. As yet another example, measurement module 140 may measure the latency, jitter, error rate, or other metrics of a network interface.

In various embodiments, prediction module 150 may analyze recent network traffic statistics from a network interface and determine its upcoming throughput requirement in real time. Thus, control module 130 may determine whether and when to enable or disable a network interface for bandwidth aggregation. In some embodiments, prediction module 150 may be application-independent if the prediction is based on the recent network traffic statistics.

In various embodiments, apparatus 100 may be implemented differently as depicted in FIG. 1. As an example, control module 130 may be integrated with network interface 110 to form a comprehensive module to predict traffic and make bandwidth aggregation determinations. As another example, measurement module 140 or prediction module 150 may be implemented as a separate module outside of control module 130. In various embodiments, components depicted in FIG. 1 may have a direct or indirect connection not shown in FIG. 2. As an example, measurement module 140 may be directly connected to network interface 110 and/or network interface 120. In other embodiments, some of the modules may be divided into multiple modules.

Except for the teachings of the present disclosure incorporated therein, apparatus 100 may be any one of a broad range of computing/networking devices. For example, apparatus 100 may be a computing device that is within a user's reach (e.g., a device that the user carries, wears, touches, gestures, etc.), in forms such as a smartphone, a wearable device, or a tablet. As a further example, apparatus 100 may be a laptop, a desktop, a server, a game console, a set-top box, a switch, a router, a gateway and so forth. As still a further example, apparatus 100 may be an Internet-Of-Thing (IOT) device, such as a smart light bulb, a smart thermostat, a smart appliance, and so forth.

Figure 2:
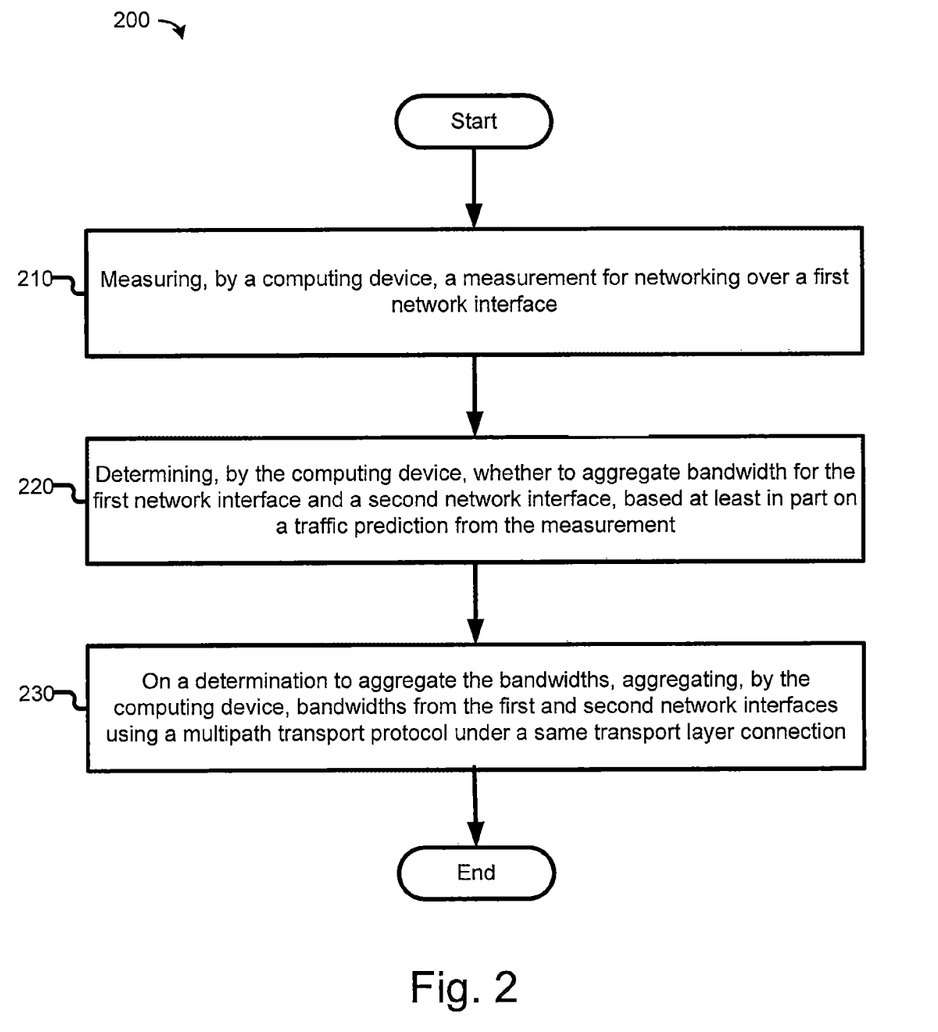
FIG. 2 is a flow diagram of an example process for traffic prediction and bandwidth aggregation, in accordance with various embodiments.

Referring now to FIG. 2, it is a flow diagram of an example process 200 for bandwidth aggregation and traffic prediction, in accordance with various embodiments. Process 200 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured to provide bandwidth aggregation and traffic prediction. As such, process 200 may be performed by a computing device, e.g., apparatus 100, to implement one or more embodiments of the present disclosure. In various embodiments, process 200 may have fewer or additional operations, or perform some of the operations in different orders.

In various embodiments, the process may begin at block 210, where a measurement for networking over a first network interface may be measured, e.g., by apparatus 100 of FIG. 1. In some embodiments, the measurement for networking may include a performance metric, such as throughput. In some embodiments, such network performance metric may be measured from every active network interface of a networking device and saved in a volatile or non-volatile memory for further analysis. In some embodiments, a programmable window may be used to measure throughput, such as based on the characteristics of the network interface or statistics of network traffic on the network interface. As an example, measurement module 140 may use one window size for measuring throughput at network interface 110, but use another different window size for measuring throughput at network interface 120. In some embodiments, measurement module 140 may retrieve network performance measurements from the underlying operating system (OS) of apparatus 100. As an example, real time statistics (e.g., throughput) may be available on many operating systems. For instance, throughput information is available from "procfs" on a Linux-based OS.

Next, at block 220, whether to aggregate bandwidth of a second network interface to the first network interface may be determined, e.g., by control module 130 of FIG. 1, based at least in part on a traffic prediction from the measurement. In various embodiments, prediction module 150 may analyze recent traffic statistics and determines future throughput requirements in real time. Accordingly, control module 130 may determine whether and when to enable or disable additional network interfaces for bandwidth aggregation.

As an example, apparatus 100 may be in a DEFAULT state initially, in which apparatus 100 may only use network interface 120 for data communication via WiFi, and network interface 110 may be disabled to save energy. However, apparatus 100 may be switched to an AGGREGATED state if the recent average throughput at network interface 120 is increasing and surpasses a predetermined threshold. By the same token, apparatus 100 may be switched back to the DEFAULT state if the recent average throughput at network interface 120 returns back to, e.g., the pre-switch level.

Next, at block 230, on a determination to aggregate the bandwidths, apparatus 100 may aggregate bandwidths from the first and second network interfaces using a multipath transport protocol under a same transport layer connection. In various embodiments, apparatus 100 may achieve bandwidth aggregation through the use of a multipath transport protocol (e.g. MultiPath Transmission Control Protocol (MPTCP), which allows a Transmission Control Protocol (TCP) connection to use multiple paths to maximize resource usage and increase redundancy). Such a multipath transport protocol may allow networking layer data flows to be associated in a single transport connection. Thus, bandwidth aggregation may be made transparent to the client and server applications. In some embodiments, even if a server does not have multipath support, a multipath proxy may still be used by the client. Support for the multipath protocol may be only required on the endpoints without changes of the underlying network. Thus, in one embodiment, apparatus 100 may use the MPTCP to combine the WiFi and 3G interfaces under the same transport layer socket, and use the aggregated bandwidth of both network interfaces for the same connection. In various embodiments, application-independent and file-independent bandwidth aggregation may be achieved by apparatus 100 when the aggregation is achieved at the transport layer. In this case, unlike many other bandwidth aggregation scenarios, it is not necessary for apparatus 100 to consider application information or file size information for its decisions related to bandwidth aggregation.

In some embodiments, bandwidth aggregation may be triggered for any upload or download session if the purpose is to simply accelerate a download or upload session without regard to energy efficiency. In other embodiments, for the bandwidth aggregation to lead to less total energy being consumed, the energy consumed by the 3G interface may need to be lower than the energy that would have been consumed by keeping on the screen of apparatus 100 had only the WiFi interface been active. In some embodiments, based on the energy consumed by an active 3G interface and a mobile device display, the effect of total energy saving may be observed if the 3G interface may account for 60% or more of the total throughput during a bandwidth aggregation session. Therefore, the determination of bandwidth aggregation may be also based on the relative bandwidth of respective network interfaces. As an example, if the cellular interface is much slower than the Wifi interface, it may not be able to save the total energy by triggering bandwidth aggregation. In one embodiment, during a bandwidth aggregation session, control module 130 may continue to monitor the network performance of the cellular interface (e.g., 3G), and may disable the cellular interface if its throughput at the moment is below a predetermined threshold (e.g., a low throughput of 100 kbps). Thus, the decision for bandwidth aggregation may also be based on the real time network information of a network interface.

Figure 3:
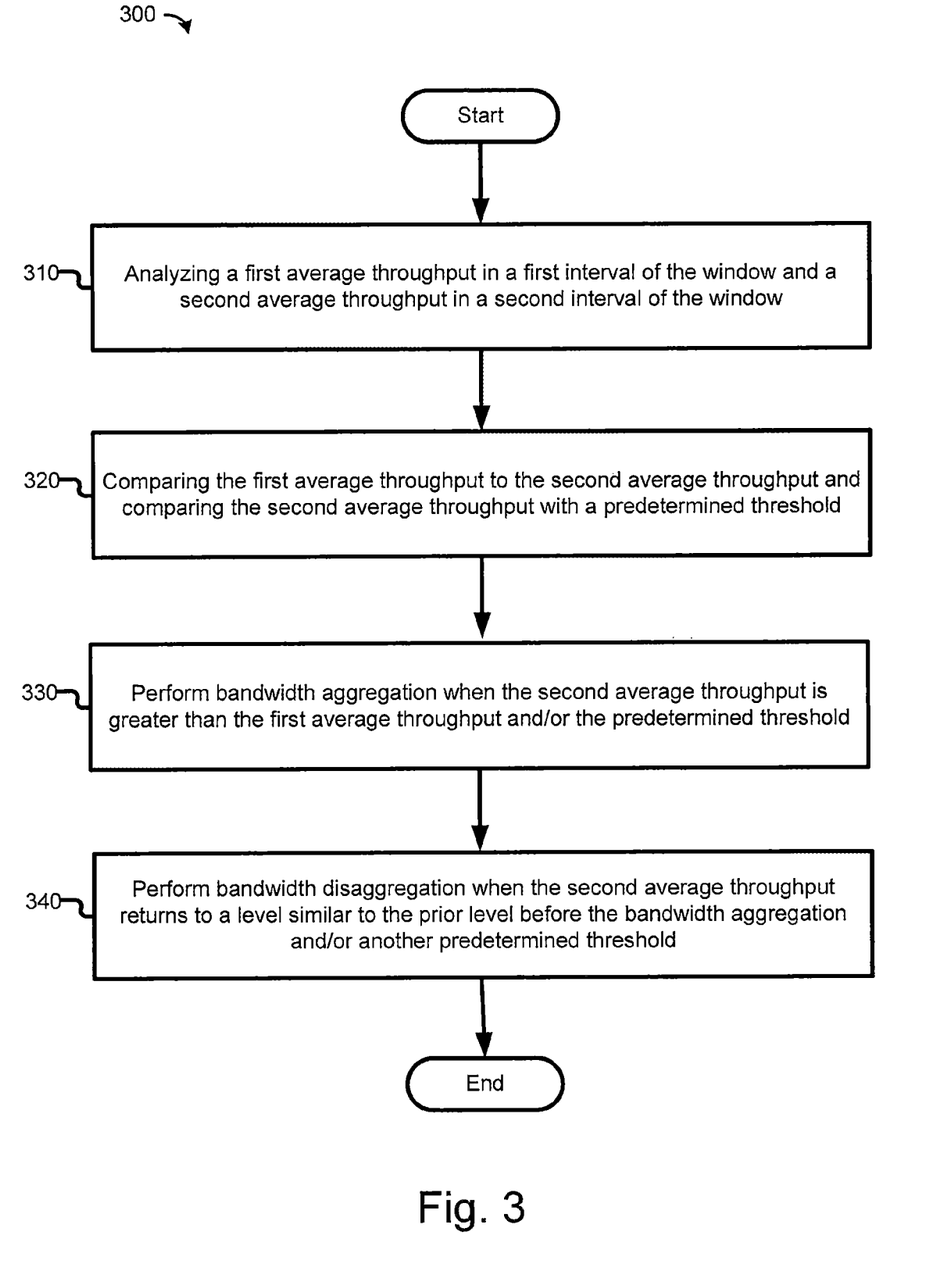
FIG. 3 is a flow diagram of an example process for bandwidth aggregation and disaggregation, in accordance with various embodiments.

Referring now to FIG. 3, it is a flow diagram of an example process 300 for bandwidth aggregation and disaggregation, in accordance with various embodiments. Process 300 may be performed by processing logic that comprises hardware (e.g., circuitry, dedicated logic, programmable logic, microcode, etc.), software (e.g., instructions run on a processing device to perform hardware simulation), or a combination thereof. The processing logic may be configured to perform traffic prediction and bandwidth aggregation and disaggregation. As such, process 300 may be performed by a computing device, e.g., apparatus 100, to implement one or more embodiments of the present disclosure. In various embodiments, process 300 may have fewer or additional operations, or perform some of the operations in different orders. In various embodiments, process 300 may be performed in reference to respective blocks in FIG. 2. In various embodiments, various blocks in FIG. 3 may be combined or arranged in any suitable order, e.g., according to the particular embodiment of apparatus 100 for bandwidth aggregation and disaggregation.

In various embodiments, the process may begin at block 310, where control module 130 may analyze a first average throughput in a first interval of the window and a second average throughput in a second interval of the window. In various embodiments, bandwidth aggregation or disaggregation may be triggered by analyzing a throughput window in, e.g., the last n seconds. The throughput window may be split into two equal intervals to determine whether the average throughput over the most recent n/2 interval is greater than the average throughput over the previous n/2 seconds. For example, if n equals 10, prediction module 150 may compare the throughput over the most recent 5 seconds with the throughput over the previous 5 seconds. In other embodiments, the n/2 interval may be further split into smaller windows for throughput analysis. In other embodiments, sub-windows with unequal intervals may also be used for throughput analysis.

Next, at block 320, control module 130 may compare the first average throughput to the second average throughput and comparing the second average throughput with a predetermined threshold. To determine a start of a traffic-heavy task, the recent average throughput in the most recent time interval (e.g., in the last n/2 interval as discussed above) may be compared to its previous time interval (e.g., in the first n/2 interval as discussed above). If the average throughput in the most recent time interval is significantly higher (e.g., 30% more) than the average throughput in its previous time interval, it may be an indication that a traffic-heavy communication session has started.

In some embodiments, to reduce some false positives, e.g., mild traffic increase, the average throughput in the most recent time interval may be further compared to a predetermined threshold (e.g. 800 kbps). In some embodiments, to further reduce some false positives, e.g., short traffic spikes, the pattern of the average throughput distribution over the most recent time interval may be further analyzed and compared, e.g., based on sub-windows further divided in the time interval. Thus, control module 130 may not trigger bandwidth aggregation upon short traffic spikes.

Next, at block 330, control module 130 may perform bandwidth aggregation when the second average throughput is greater than the first average throughput and/or the predetermined threshold. In some embodiments, control module 130 may only trigger bandwidth aggregation if the average throughput at the most recent time interval is greater than the average throughput of the previous time interval and is greater than the predetermined threshold as well. In other embodiments, control module 130 may trigger bandwidth aggregation as long as the average throughput at the most recent time interval is greater than the predetermined threshold, which generally may be set to indicate heavy traffic.

Next, at block 340, control module 130 may perform bandwidth disaggregation when the second average throughput returns to a level similar to the prior level before the bandwidth aggregation or another predetermined threshold. In various embodiments, the prior level before the bandwidth aggregation may be kept in memory. When the network traffic wanes to a level similar to the prior level, e.g., within a margin of 10% of the prior level, control module 130 may trigger bandwidth disaggregation and further disable one or more network interfaces to save energy. In some embodiments, the most recent average throughput may be compared with another predetermined threshold, which may be used to indicate a relatively low traffic demand of the device. To save energy, control module 130 may trigger bandwidth disaggregation in this case.

In some embodiments, if a network interface (e.g., a 3G interface) offers only a low throughput after bandwidth aggregation, control module 130 may perform bandwidth disaggregation with an incremental back off timer. The back off timer may be increased (e.g., doubled) every time the network interface is deemed not good enough to support bandwidth aggregation in respect to energy saving, e.g., if the throughput does not reach a desired threshold. The network interface may be deactivated until the back off timer has expired.

Figure 4:
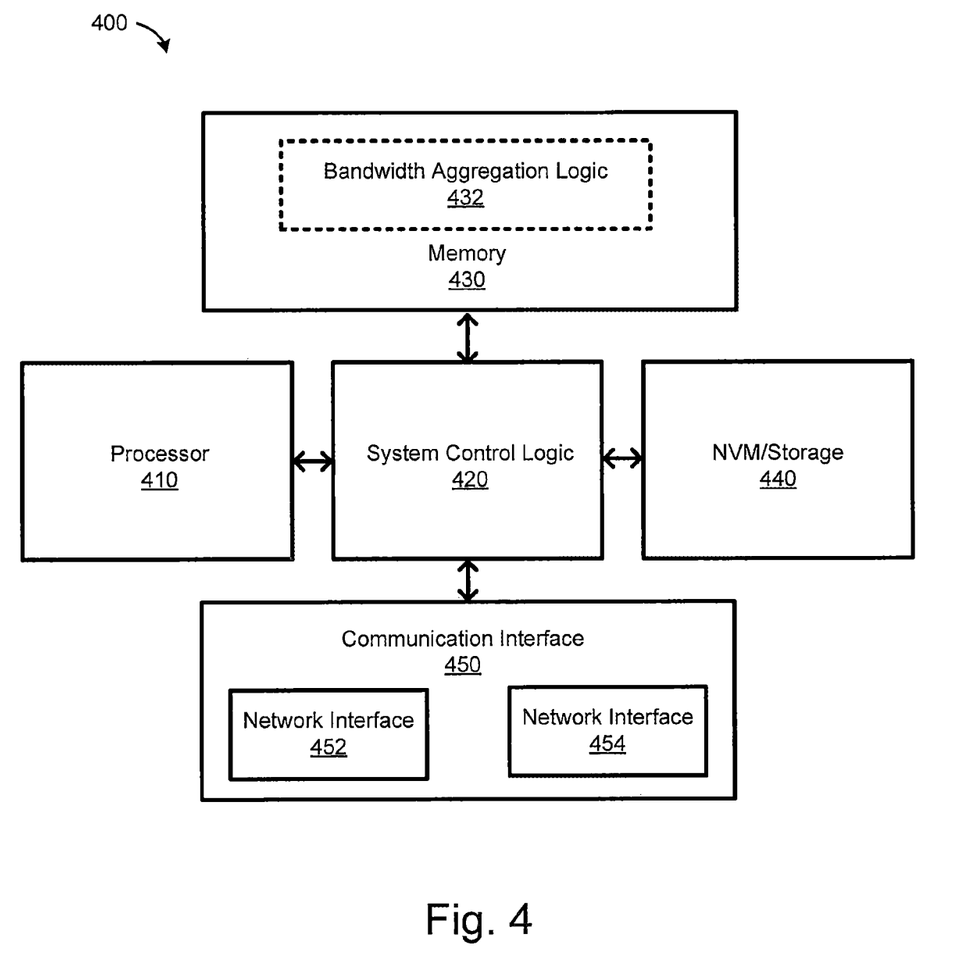
FIG. 4 illustrates an example computing device suitable for practicing aspects of the present disclosure, in accordance with various embodiments.

FIG. 4 illustrates an embodiment of a computing device 400 suitable for practicing embodiments of the present disclosure. Computing device 400 may be any computing device that is within a user's reach (e.g., a device that the user carries, wears, touches, gestures, etc.), in forms such as a smartphone, a wearable device, or a tablet. As a further example, computing device 400 may be a laptop, a desktop, a server, a game console, a set-top box, a switch, a router, a gateway and so forth. As still a further example, computing device 400 may be an Internet-Of-Thing (JOT) device, such as a smart light bulb, a smart thermostat, a smart appliance, and so forth. As illustrated, computing device 400 may include system control logic 420 coupled to processor 420, to system memory 430, to non-volatile memory (NVM)/ storage 440, and to communication interface 450. In various embodiments, processor 420 may include one or more processor cores.

In various embodiments, communication interface 450 may provide multiple network interface, including network interface 452 and network interface 454, for computing device 400 to communicate with another computing device (e.g., a server) as previously discussed in connection with FIG. 1. Communication interface 450 may include any suitable hardware and/or firmware, such as a network adapter, one or more antennas, wireless interface(s), and so forth. In various embodiments, communication interface 450 may include an interface for computing device 400 to use near field communication (NFC), optical communications, or other similar technologies to communicate directly (e.g., without an intermediary) with another device, including sensors. In various embodiments, communication interface 450 may interoperate with radio communications technologies such as, for example, Wideband Code Division Multiple Access (WCDMA), Global System for Mobile Communications (GSM), Long Term Evolution (LTE), Bluetooth®, Zigbee, and the like. In various embodiments, network interface 452 or network interface 454 may provide a network interface for computing device 400 to communicate over one or more network(s) and/or with any other suitable device. In some embodiments, network interface 452 may be a WiFi interface, and network interface 454 may be a cellular network interface.

In some embodiments, system control logic 420 may include any suitable interface controllers to provide for any suitable interface to the processor 420 and/or to any suitable device or component in communication with system control logic 420. System control logic 420 may also interoperate with a display (not shown) for display of information, such as to a user. In various embodiments, the display may include one of various display formats and forms, such as, for example, liquid-crystal displays, cathode-ray tube displays, e-ink displays, projection displays. In various embodiments, the display may include a touch screen.

In some embodiments, system control logic 420 may include one or more memory controller(s) (not shown) to provide an interface to system memory 430. System memory 430 may be used to load and store data and/or instructions, for example, for computing device 400. System memory 430 may include any suitable volatile memory, such as dynamic random access memory (DRAM), for example.

In some embodiments, system control logic 420 may include one or more input/output (I/O) controller(s) (not shown) to provide an interface to NVM/storage 440 and communication interface 450. NVM/storage 440 may be used to store data and/or instructions, for example. NVM/storage 440 may include any suitable non-volatile memory, such as flash memory, for example, and/or may include any suitable non-volatile storage device(s), such as one or more hard disk drive(s) (HDD), one or more solid-state drive(s), one or more compact disc (CD) drive(s), and/or one or more digital versatile disc (DVD) drive(s), for example. NVM/storage 440 may include a storage resource that is physically part of a device on which computing device 400 is installed or it may be accessible by, but not necessarily a part of, computing device 400. For example, NVM/storage 440 may be accessed by computing device 400 over a network via communication interface 450.

In various embodiments, system memory 430, NVM/storage 440, and system control logic 420 may include, in particular, temporal and persistent copies of bandwidth aggregation logic 432. Bandwidth aggregation logic 432 may include instructions that, when executed by processor 420, result in computing device 400 conducting bandwidth aggregation and traffic prediction, such as, but not limited to, process 200 or 300. In various embodiments, bandwidth aggregation logic 432 may include instructions that, when executed by processor 420, result in computing device 400 performing various functions associated with network interface 110, network interface 120, control module 130, traffic measurement module 140, or traffic prediction module 150 in connection with FIG. 1.

In some embodiments, processor 420 may be packaged together with system control logic 420 and/or bandwidth aggregation logic 432. In some embodiments, at least one of the processor(s) 420 may be packaged together with system control logic 420 and/or bandwidth aggregation logic 432 to form a System in Package (SiP). In some embodiments, processor 420 may be integrated on the same die with system control logic 420 and/or bandwidth aggregation logic 432. In some embodiments, processor 420 may be integrated on the same die with system control logic 420 and/or bandwidth aggregation logic 432 to form a System on Chip (SoC).

Depending on which modules of apparatus 100 in connection with FIG. 1 are hosted by computing device 400, the capabilities and/or performance characteristics of processor 420, system memory 430, and so forth, may vary. In various implementations, computing device 400 may be a smartphone, a tablet, a mobile computing device, a wearable computing device, a server, etc., enhanced with the teachings of the present disclosure.

Figure 5:
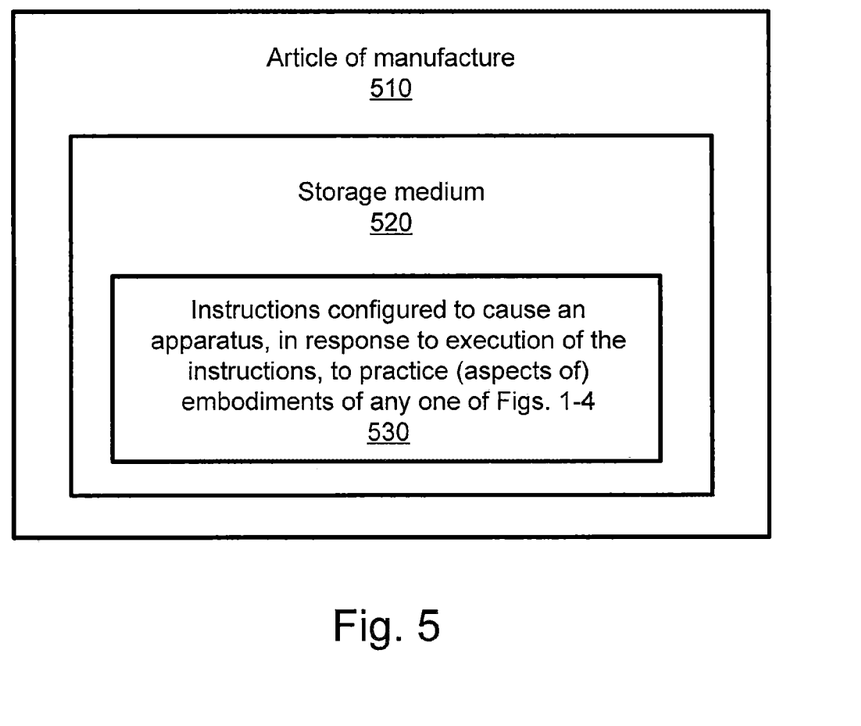
FIG. 5 illustrates an article of manufacture having programming instructions that implement aspects of the present disclosure, in accordance with various embodiments.

FIG. 5 illustrates an article of manufacture 510 having programming instructions, incorporating aspects of the present disclosure, in accordance with various embodiments. In various embodiments, an article of manufacture may be employed to implement various embodiments of the present disclosure. As shown, the article of manufacture 510 may include a computer-readable non-transitory storage medium 520 where instructions 530 are configured to practice embodiments or aspects of embodiments related to any one of the figures described herein. The storage medium 520 may represent a broad range of persistent storage media known in the art, including but not limited to flash memory, dynamic random access memory, static random access memory, an optical disk, a magnetic disk, etc. Instructions 530 may enable an apparatus, in response to their execution by the apparatus, to perform various operations described herein. For example, storage medium 520 may include instructions 530 configured to cause an apparatus, e.g., apparatus 100 of FIG. 1, to practice some or all aspects of bandwidth aggregation and traffic prediction, as illustrated in process 200 of FIG. 2, process 300 of FIG. 3, or aspects of embodiments of any one of the figures disclosed herein. In various embodiments, computer-readable storage medium 520 may include one or more computer-readable non-transitory storage media. In other embodiments, computer-readable storage medium 520 may be transitory, such as signals, encoded with instructions 530.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

The following paragraphs describe examples of various embodiments.

A first kind of examples may include an apparatus for computing, which may include a first and a second network interface with support of a multipath transport protocol; and a control module, coupled to the first and second network interfaces, to determine whether to aggregate bandwidth of the first and second network interfaces under a same transport layer connection, using the multipath transport protocol, based at least in part on a traffic prediction of the first network interface.

Another example may include the apparatus of any of the preceding first kind of examples, wherein the first network interface has a lower energy consumption rate than the second network interface, and the first network interface is a default network interface.

Another example may include the apparatus of any of the preceding first kind of examples, wherein the first network interface is a WiFi interface, and the second network interface is a cellular network interface.

Another example may include the apparatus of any of the preceding first kind of examples, wherein the control module is further to estimate bandwidth requirements in real time based at least in part on an average throughput of the first network interface.

Another example may include the apparatus of any of the preceding first kind of examples, wherein the control module is to receive a first average throughput in a first interval of a window of the first network interface and a second average throughput in a second interval of the window, and to aggregate bandwidth from the first and second network interfaces when the second average throughput is greater than the first average throughput and a predetermined threshold.

Another example may include the apparatus of any of the preceding first kind of examples, wherein the control module is to determine a traffic spike during the first or second interval of the window and reduce an effect caused by the traffic spike on the first or second average throughput.

Another example may include the apparatus of any of the preceding first kind of examples, wherein the control module is deactivate bandwidth aggregation of the first and second network interfaces when the traffic measurement returns to a pre-aggregation level or is below a predetermined threshold.

A second kind of examples may include a method for computing, comprising: measuring, by a computing device, a measurement for networking over a first network interface; determining, by the computing device, whether to aggregate bandwidth for the first network interface and a second network interface, based at least in part on a traffic prediction from the measurement; and on a determination to aggregate the bandwidths, aggregating, by the computing device, bandwidths from the first and second network interfaces using a multipath transport protocol under a same transport layer connection.

Another example may include the method of any of the preceding second kind of examples, and the method further include selecting, by the computing device, the second network interface from a plurality of network interfaces coupled to the computing device based on a predetermined order.

Another example may include the method of any of the preceding second kind of examples, wherein the measurement is throughput, and the method further include analyzing, by the computing device, an average throughput in a window of the first network interface.

Another example may include the method of any of the preceding second kind of examples, wherein the analyzing includes analyzing a first average throughput in a first interval of the window and a second average throughput in a second interval of the window.

Another example may include the method of any of the preceding second kind of examples, wherein the determining includes comparing the first average throughput to the second average throughput and comparing the second average throughput with a predetermined threshold.

Another example may include the method of any of the preceding second kind of examples, wherein the determining includes determining to aggregate bandwidth from the second network interface when the second average throughput is greater than the first average throughput and the predetermined threshold.

Another example may include the method of any of the preceding second kind of examples, wherein the determining includes determining a traffic spike during the second interval of the window and mitigating an effect caused by the traffic spike on the second average throughput.

Another example may include the method of any of the preceding second kind of examples and the method further include analyzing an average throughput in another window.

Another example may include the method of any of the preceding second kind of examples, and the method further include deactivating bandwidth aggregation from the second network interface when the average throughput of the first network interface returns a level below the first average throughput.

Another example may include the method of any of the preceding second kind of examples, and the method further include deactivating the second network interface when a throughput of the second network interface is below a predetermined threshold; and Another example may include the method of any of the preceding second kind of examples, and the method further include adding a back off time to a timer to keep the second network interface deactivated for at least the back off time.

Another example may include an apparatus comprising means to perform any of the preceding second kind of examples.

Another example may include one or more non-transitory computer readable media comprising instructions to cause an apparatus, upon execution of the instructions by one or more processors of the apparatus, to perform any of the preceding second kind of examples.

An abstract is provided that will allow the reader to ascertain the nature and gist of the technical disclosure. The abstract is submitted with the understanding that it will not be used to limit the scope or meaning of the claims. The following claims are hereby incorporated into the detailed description, with each claim standing on its own as a separate embodiment.

What is claimed is:

1. An apparatus for computer networking, comprising:
a first and a second network interface with support of a multipath transport protocol; and
a control module, coupled to the first and second network interfaces, to determine whether to aggregate bandwidth of the first and second network interfaces under a same transport layer connection, using the multipath transport protocol, based at least in part on a traffic prediction of the first network interface;
wherein the control module is to receive a first average throughput in a first interval of a window of the first network interface and a second average throughput in a second interval of the window, and to aggregate bandwidth from the first and second network interfaces when the second average throughput is greater than the first average throughput and a predetermined threshold.

2. The apparatus according to claim 1, wherein the first network interface has a lower energy consumption rate than the second network interface, and the first network interface is a default network interface.

3. The apparatus according to claim 1, wherein the first network interface is a WiFi interface and the second network interface is a cellular network interface.

4. The apparatus according to claim 3, wherein the control module is further to estimate bandwidth requirements in real time based at least in part on an average throughput of the first network interface.

5. The apparatus according to claim 1, wherein the control module is to deactivate bandwidth aggregation of the first and second network interfaces when the traffic measurement returns to a pre-aggregation level or is below a predetermined threshold.

6. The apparatus according to claim 1, wherein the control module is to determine a traffic spike during the first or second interval of the window and reduce an effect caused by the traffic spike on the first or second average throughput.

7. A method for computer networking, comprising:
measuring, by a computing device, a measurement for networking over a first network interface;
determining, by the computing device, whether to aggregate bandwidth for the first network interface and a second network interface, based at least in part on a traffic prediction from the measurement; and
on a determination to aggregate the bandwidths, aggregating, by the computing device, bandwidths from the first and second network interfaces using a multipath transport protocol under a same transport layer connection;
wherein the measurement is throughput, and the method further comprises analyzing, by the computing device, an average throughput in a window of the first network interface, the analyzing including analyzing a first average throughput in a first interval of the window and a second average throughput in a second interval of the window; and
wherein the determining comprises comparing the first average throughput to the second average throughput and comparing the second average throughput with a predetermined threshold.

8. The method of claim 7, further comprising:
deactivating the second network interface when a throughput of the second network interface is below a predetermined threshold; and
adding a back off time to a timer to keep the second network interface deactivated for at least the back off time.

9. The method of claim 7, further comprising:
selecting, by the computing device, the second network interface from a plurality of network interfaces coupled to the computing device based on a predetermined order.

10. The method of claim 7, wherein the determining comprises determining to aggregate bandwidth from the second network interface when the second average throughput is greater than the first average throughput and the predetermined threshold.

11. The method of claim 10, wherein the determining comprises determining a traffic spike during the second interval of the window and mitigating an effect caused by the traffic spike on the second average throughput.

12. The method of claim 10, further comprising:
analyzing an average throughput in another window; and
deactivating bandwidth aggregation from the second network interface when the average throughput of the first network interface returns to a level below the first average throughput.

13. At least one non-transitory computer readable medium, comprising:
a plurality of instructions configured to cause an apparatus, in response to execution of the instructions by the apparatus, to:
measure a networking measurement over a first network interface;
determine whether to aggregate bandwidth from a second network interface based at least in part on a traffic prediction from the measurement; and
aggregate bandwidth from the second network interface to the first network interface using a multipath transport protocol under a same transport layer connection;
wherein to determine comprises to measure a first average throughput in a first interval of a window of the first network interface and a second average throughput in a second interval of the window; and
wherein to aggregate comprises to aggregate bandwidth from the second network interface when the second average throughput is greater than the first average throughput and a predetermined threshold.

14. The storage medium of claim 13, the instructions configured to further cause the apparatus to:
measure another average throughput in another window of the first network interface; and
disaggregate the second network interface when the another average throughput returns to the first average throughput level or is below another predetermined threshold.

* * * * *